(12) United States Patent
Saraie et al.

(10) Patent No.: US 10,590,988 B2
(45) Date of Patent: Mar. 17, 2020

(54) MACHINE TOOL AND METHOD FOR PRODUCING STRUCTURE FOR MACHINE TOOL

(71) Applicant: DMG MORI CO., LTD., Yamatokoriyama-shi (JP)

(72) Inventors: Hidenori Saraie, Yamatokoriyama (JP); Hiroaki Kawaguchi, Yamatokoriyama (JP); Keiichiro Matsuo, Yamatokoriyama (JP)

(73) Assignee: DMG MORI CO., LTD., Yamatokoriyama-shi (JP)

( * ) Notice: Subject to any disclaimer, the term of this patent is extended or adjusted under 35 U.S.C. 154(b) by 1 day.

(21) Appl. No.: 15/493,297

(22) Filed: Apr. 21, 2017

(65) Prior Publication Data
US 2017/0307010 A1 Oct. 26, 2017

(30) Foreign Application Priority Data
Apr. 26, 2016 (JP) .................................. 2016-087864

(51) Int. Cl.
*F16C 29/00* (2006.01)
*B23Q 11/12* (2006.01)
*B23Q 1/01* (2006.01)
*F16C 29/02* (2006.01)

(52) U.S. Cl.
CPC ............ *F16C 29/005* (2013.01); *B23Q 1/017* (2013.01); *B23Q 11/124* (2013.01); *F16C 29/02* (2013.01); *F16C 2220/60* (2013.01); *F16C 2322/39* (2013.01)

(58) Field of Classification Search
CPC .... F16C 33/1064; F16C 29/02; F16C 29/005; F16C 2322/39; F16C 2220/60; B23C 3/30; B23Q 1/017; B23Q 11/124
See application file for complete search history.

(56) References Cited

U.S. PATENT DOCUMENTS

| 3,318,557 | A | * | 5/1967 | Zhed | F16C 29/02 |
|---|---|---|---|---|---|
| | | | | | 180/125 |
| 3,863,995 | A | * | 2/1975 | Jones | F16C 29/025 |
| | | | | | 384/106 |
| 5,374,125 | A | * | 12/1994 | McMurtry | B23Q 1/26 |
| | | | | | 384/12 |
| 5,668,421 | A | * | 9/1997 | Gladish | B60L 13/10 |
| | | | | | 104/23.2 |

(Continued)

FOREIGN PATENT DOCUMENTS

| DE | 880 839 C | 6/1953 |
|---|---|---|
| DE | 93 15 589 U1 | 12/1993 |

(Continued)

*Primary Examiner* — Alan B Waits
(74) *Attorney, Agent, or Firm* — Oblon, McClelland, Maier & Neustadt, L.L.P.

(57) ABSTRACT

A machine tool includes: a movably configured saddle; and a bed having a sliding surface supplied with a lubricant and allowing the saddle to slide thereon, and receiving the weight of the saddle. The sliding surface has a recess continuously extending in a direction in which the saddle moves. By this configuration, a machine tool which easily holds a lubricant on a sliding surface and a method for producing a structure for the machine tool having the sliding surface are provided.

10 Claims, 8 Drawing Sheets

(56) References Cited

U.S. PATENT DOCUMENTS

| | | | | |
|---|---|---|---|---|
| 5,704,716 A | * | 1/1998 | Jantunen | E21B 19/08 384/41 |
| 6,749,378 B2 | * | 6/2004 | Saito | B23Q 1/017 409/135 |
| 7,785,009 B2 | * | 8/2010 | Saito | F16C 29/025 384/12 |
| 2003/0099414 A1 | * | 5/2003 | Okabe | F16C 29/02 384/42 |
| 2005/0013512 A1 | * | 1/2005 | Saito | F16C 17/102 384/12 |
| 2007/0127995 A1 | * | 6/2007 | Matsumura | B23C 3/30 409/132 |
| 2007/0201775 A1 | * | 8/2007 | Saito | F16C 29/025 384/12 |
| 2013/0183888 A1 | * | 7/2013 | Guo | B23P 15/006 451/57 |
| 2014/0137776 A1 | * | 5/2014 | Thomas | F16C 29/04 108/143 |
| 2017/0284464 A1 | * | 10/2017 | Suzuki | F16C 29/025 |
| 2018/0010709 A1 | * | 1/2018 | Yoshida | F16C 29/02 |

FOREIGN PATENT DOCUMENTS

| | | | |
|---|---|---|---|
| GB | 948 140 A | | 1/1964 |
| GB | 1 035 662 A | | 7/1966 |
| JP | 4-122501 | | 4/1992 |
| JP | 2003165012 A | * | 6/2003 |
| JP | 2008-279570 A | | 11/2008 |

* cited by examiner

MACHINE TOOL AND METHOD FOR PRODUCING STRUCTURE FOR MACHINE TOOL

BACKGROUND OF THE INVENTION

Field of the Invention

The present invention relates to a machine tool and a method for producing a structure for the machine tool.

Description of the Background Art

Regarding a conventional machine tool, for example, Japanese Patent Laying-Open No. 4-122501 discloses an opposed spindle lathe intended to inexpensively supply a y-axis mechanism equipped-opposed spindle lathe having a large y-axis stroke, and having a simple structure and also having little failure, and furthermore, reduce a cost associated with tooling.

In the opposed spindle lathe disclosed in Japanese Patent Laying-Open No. 4-122501, a sliding surface for a headstock and a sliding surface for a tool rest in a direction along a z axis are cut in and thus provided on a slant surface of a slant bed. On the sliding surface for the headstock, a first headstock and a second headstock are placed movably in the direction along the z axis. On the sliding surface for the tool rest, a carriage carrying a first tool rest is placed movably in the direction along the z axis.

SUMMARY OF THE INVENTION

As disclosed in Japanese Patent Laying-Open No. 4-122501, a machine tool has a structure moved by sliding a sliding surface. Furthermore, to allow the structure's smooth movement, it is necessary to supply the sliding surface with a lubricant.

Although the lubricant supplied to the sliding surface stays on the sliding surface to some extent due to its viscosity, it would flow out of the sliding surface as the machine tool is operated. In that case, the sliding surface has the lubricant thereon insufficiently, and being incapable of sliding the structure smoothly is a matter of concern. Such a concern is remarkable when the sliding surface is a slant surface, as in the slant bed disclosed in Japanese Patent Laying-Open No. 4-122501, in particular.

Accordingly, an object of the present invention is to solve the above problem, and contemplates a machine tool which easily holds a lubricant on a sliding surface and a method for producing a structure for the machine tool having the sliding surface.

A machine tool according to the present invention comprises: a movably configured, first structure; and a second structure having a sliding surface supplied with a lubricant and allowing the first structure to slide thereon, and receiving a weight of the first structure. The sliding surface has a recess continuously extending in a direction in which the first structure moves.

Note that a plurality of recesses provided by scraping are provided discontinuously (or randomly) in the direction in which the first structure moves, and accordingly, they are not included in the recess according to the present invention.

A method for producing a structure for a machine tool according to the present invention is a method for producing a structure for a machine tool having a sliding surface. The method for producing a structure for a machine tool comprises: preparing a rotary tool for plane surface-machining; and forming a recess in a sliding surface by relatively moving the rotary tool and the structure with the rotary tool and the structure having their postures fixed such that the sliding surface and an axis of rotation of the rotary tool intersect obliquely and a direction in which the rotary tool and the structure relatively move and the axis of rotation of the rotary tool intersect obliquely.

The present invention can provide a machine tool which easily holds a lubricant on a sliding surface and a method for producing a structure for the machine tool having the sliding surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
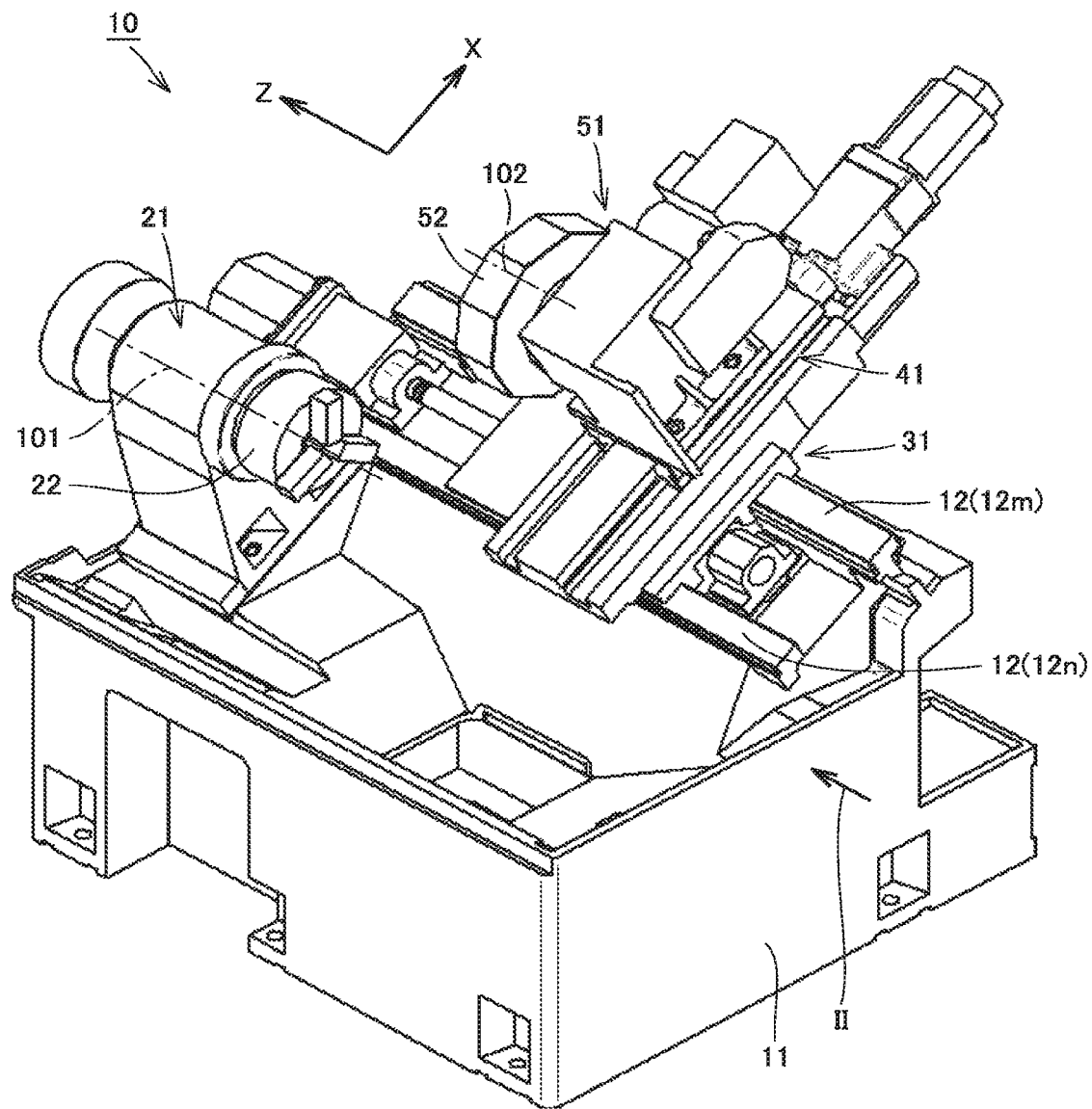
FIG. 1 is a perspective view of a machine tool in a first embodiment of the present invention.

An embodiment of the present invention will now be described with reference to the drawings. In the drawings referenced below, the same or corresponding members are denoted by the same numerals.

First Embodiment

Figure 2:
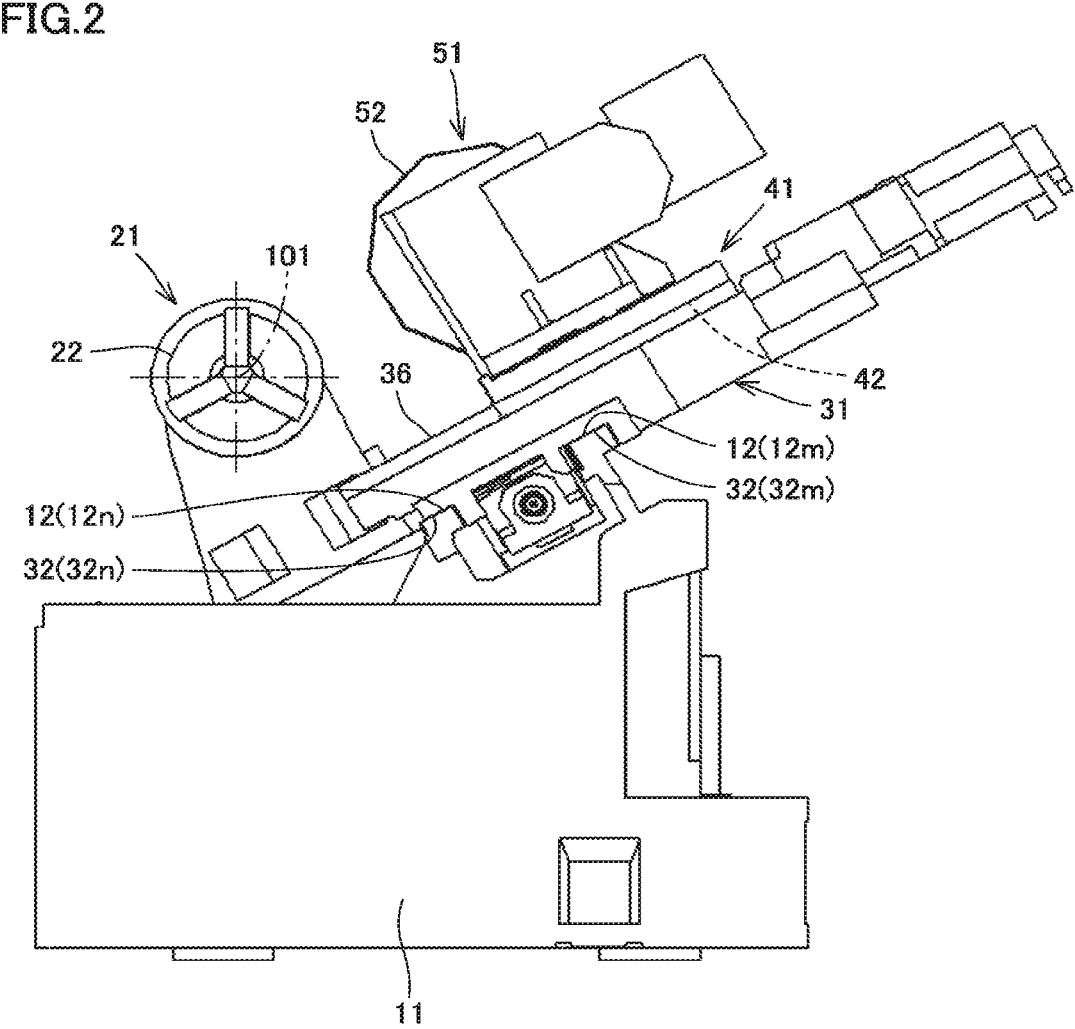
FIG. 2 is a side view of the machine tool as observed in a direction indicated in FIG. 1 by an arrow II.

FIG. 1 is a perspective view of a machine tool in a first embodiment of the present invention. In FIG. 1, a cover body which presents the appearance of the machine tool is seen through and thus an interior of the machine tool is shown. FIG. 2 is a side view of the machine tool as observed in a direction indicated in FIG. 1 by an arrow II.

With reference to FIG. 1 and FIG. 2, a machine tool 10 in the present embodiment is a lathe which rotates a workpiece and brings a tool into contact with the workpiece to process the workpiece.

First, an overall structure of machine tool 10 will be described. Machine tool 10 has a bed 11, a headstock 21, a saddle 31, a cross slide 41, and a tool rest 51.

Bed 11 is a base member for supporting headstock 21, saddle 31, cross slide 41, and tool rest 51, and installed in a factory or the like and placed on an installation surface. Bed 11 is formed of a metal such as cast iron. Bed 11 is of a so-called slant bed type, and a supporting surface which supports headstock 21, saddle 31, cross slide 41, and tool rest 51 is slanted relative to the horizontal direction.

Headstock 21 has a spindle (not shown) and a chuck 22. The spindle is provided rotatably about a central axis 101 parallel to a horizontally extending z axis. Chuck 22 is provided at a tip of the spindle and is configured to be capable of gripping a workpiece. The spindle rotates the workpiece gripped by chuck 22.

Tool rest 51 is configured to allow a plurality of tools to be attached thereto. Tool rest 51 is of a so-called turret type allowing a plurality of tools to be radially attached thereto and thus performs swivel indexing. More specifically, tool rest 51 has a swivel unit 52. Swivel unit 52 is configured to be swivelable about a central axis 102 parallel to the z axis. At positions located at intervals in the direction of the circumference with central axis 102 serving as a center, tool holders for holding tools are attached. Swivel unit 52 swivels about central axis 102 to thereby circumferentially move the tools held by the tool holders, and a tool to be used for working is indexed.

Saddle 31 is configured to be movable in a direction along the z axis. Saddle 31 is supported by bed 11. Bed 11 receives the weight of saddle 31. Cross slide 41 is configured to be movable in a direction along an x axis which is orthogonal to the Z axis and is slanted relative to the vertical direction. Cross slide 41 is supported by saddle 31. Saddle 31 receives the weight of cross slide 41. Tool rest 51 is fixed to cross slide 41.

By this configuration, tool rest 51 is supported on bed 11 via saddle 31 and cross slide 41. Tool rest 51 is configured to be movable in the direction along the x axis and that along the z axis by various feed mechanisms, guide mechanisms, a servo motor, and the like provided on bed 11, saddle 31 and cross slide 41. As tool rest 51 moves in the direction along the x axis and that along the z axis, a position at which a tool attached to tool rest 51 processes a workpiece moves.

Figure 3:
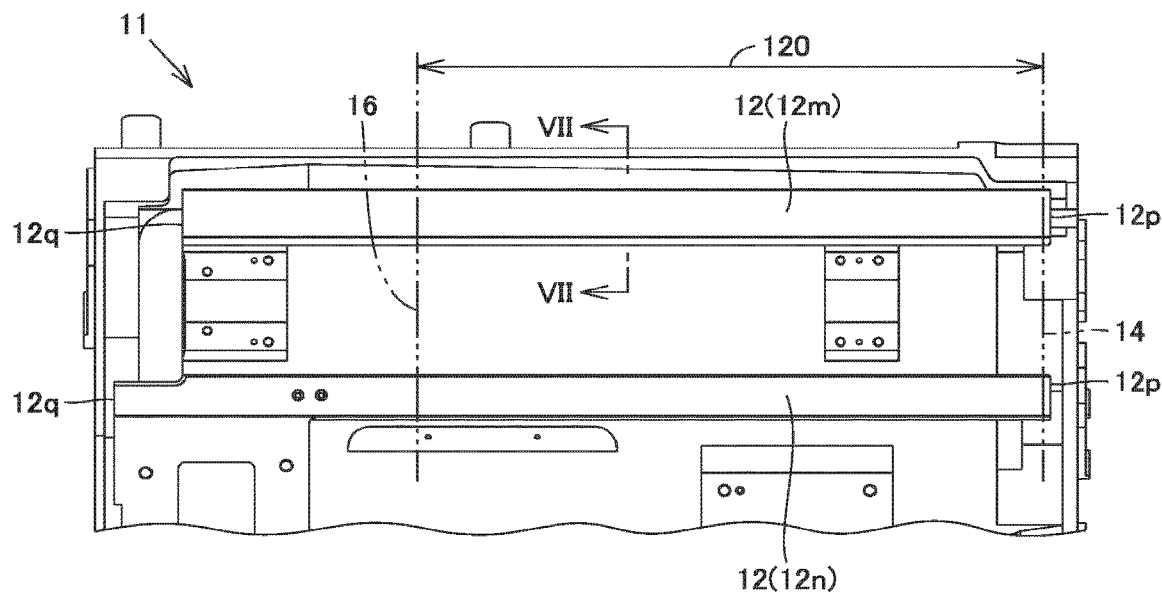
FIG. 3 shows a sliding surface of a bed included in the machine tool shown in FIG. 1.
Figure 4:
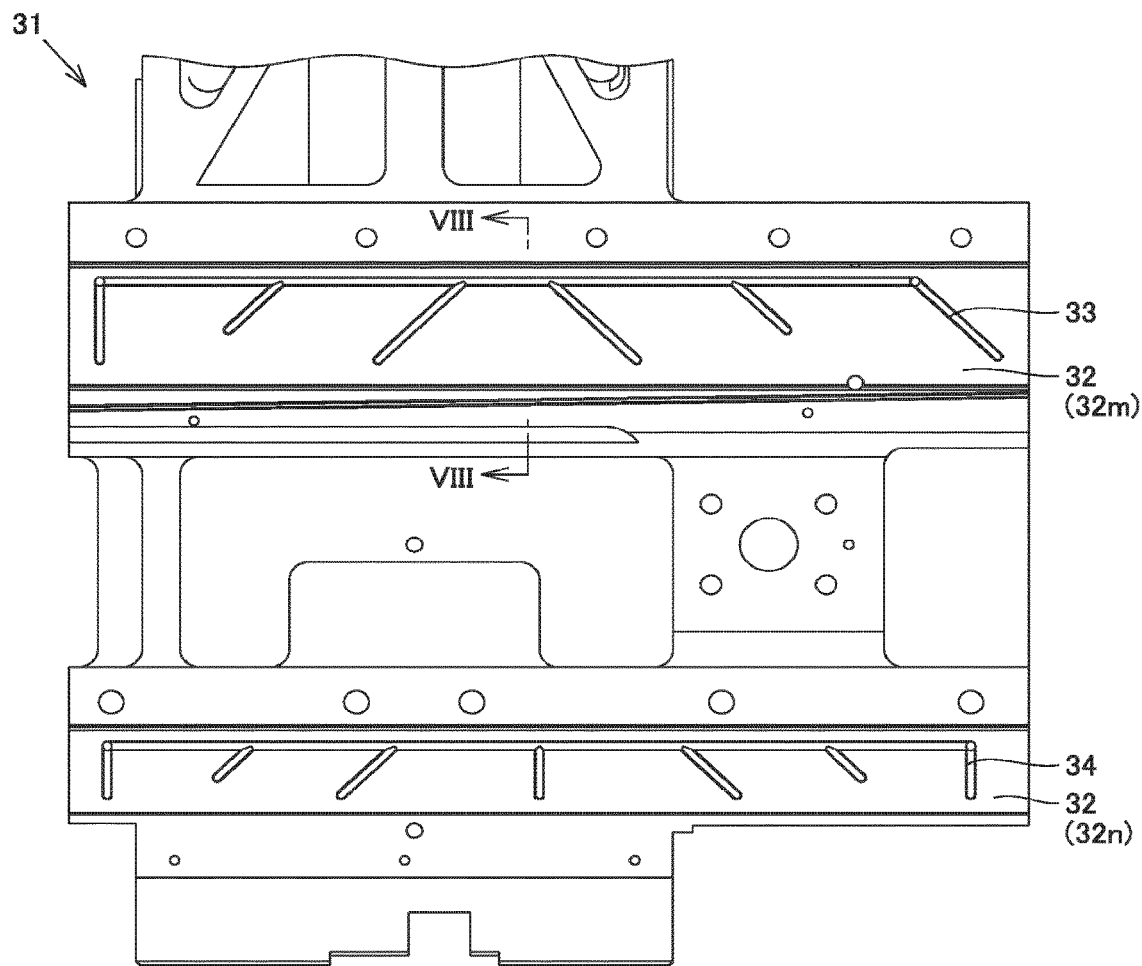
FIG. 4 shows a sliding surface (facing the bed) of a saddle included in the machine tool shown in FIG. 1.

FIG. 3 shows a sliding surface of the bed included in the machine tool shown in FIG. 1. FIG. 4 shows a sliding surface (facing the bed) of the saddle included in the machine tool shown in FIG. 1.

With reference to FIGS. 1-4, bed 11 has a sliding surface 12m and a sliding surface 12n (hereinafter, when sliding surface 12m and sliding surface 12n are not distinguished, they will collectively be referred to as a sliding surface 12). Sliding surface 12 extends in the direction along the z axis in an elongate form. Sliding surface 12m and sliding surface 12n extend in parallel in the direction along the z axis. Sliding surface 12m and sliding surface 12n are spaced in the direction along the x axis. Sliding surface 12 in a plan view is substantially a rectangle having a longer side in the direction along the z axis and a shorter side (i.e., a width) in the direction along the x axis.

Sliding surface 12 faces vertically upward (more specifically, obliquely upward). Sliding surface 12, in a widthwise direction orthogonal to a direction in which saddle 31 moves (i.e., in the direction along the x axis), is slanted relative to the horizontal direction.

Saddle 31 has opposed surfaces 32m and 32n (hereinafter, when opposed surfaces 32m and 32n are not distinguished, they will collectively be referred to as an opposed surface 32). Opposed surface 32 extends in the direction along the z axis in an elongate form. Opposed surface 32m and opposed surface 32n extend in parallel in the direction along the z axis. Opposed surface 32m and opposed surface 32n are spaced in the direction along the x axis. Opposed surface 32 in a plan view is substantially a rectangle having a longer side in the direction along the z axis and a shorter side in the direction along the x axis. A length of opposed surface 32 in the direction along the z axis is smaller than a length of sliding surface 12 in the direction along the z axis.

Saddle 31 has a lubricant supply portion 33 and a lubricant supply portion 34 formed therein. Lubricant supply portion 33 and lubricant supply portion 34 are provided in opposed surface 32m and opposed surface 32n, respectively. Lubricant supply portions 33 and 34 extend in the form of grooves in surfaces of opposed surfaces 32m and 32n, respectively.

Saddle 31 is placed on sliding surface 12 of bed 11. Saddle 31 is provided on bed 11 such that opposed surface 32m and opposed surface 32n face sliding surface 12m and sliding surface 12n, respectively. Saddle 31 is provided to straddle sliding surface 12m and sliding surface 12n.

As saddle 31 moves in the direction along the z axis, saddle 31 slides on sliding surface 12. At the time, a lubricant is supplied from saddle 31 via lubricant supply portion 33 and lubricant supply portion 34 to sliding surface 12. Saddle 31 moves in the direction along the z axis on sliding surface 12 between a first movement end 14 and a second movement end 16 (see FIG. 3). More specifically, saddle 31 slides on sliding surface 12 in contact therewith in a stroke range 120 between first movement end 14 and second movement end 16.

Figure 5:
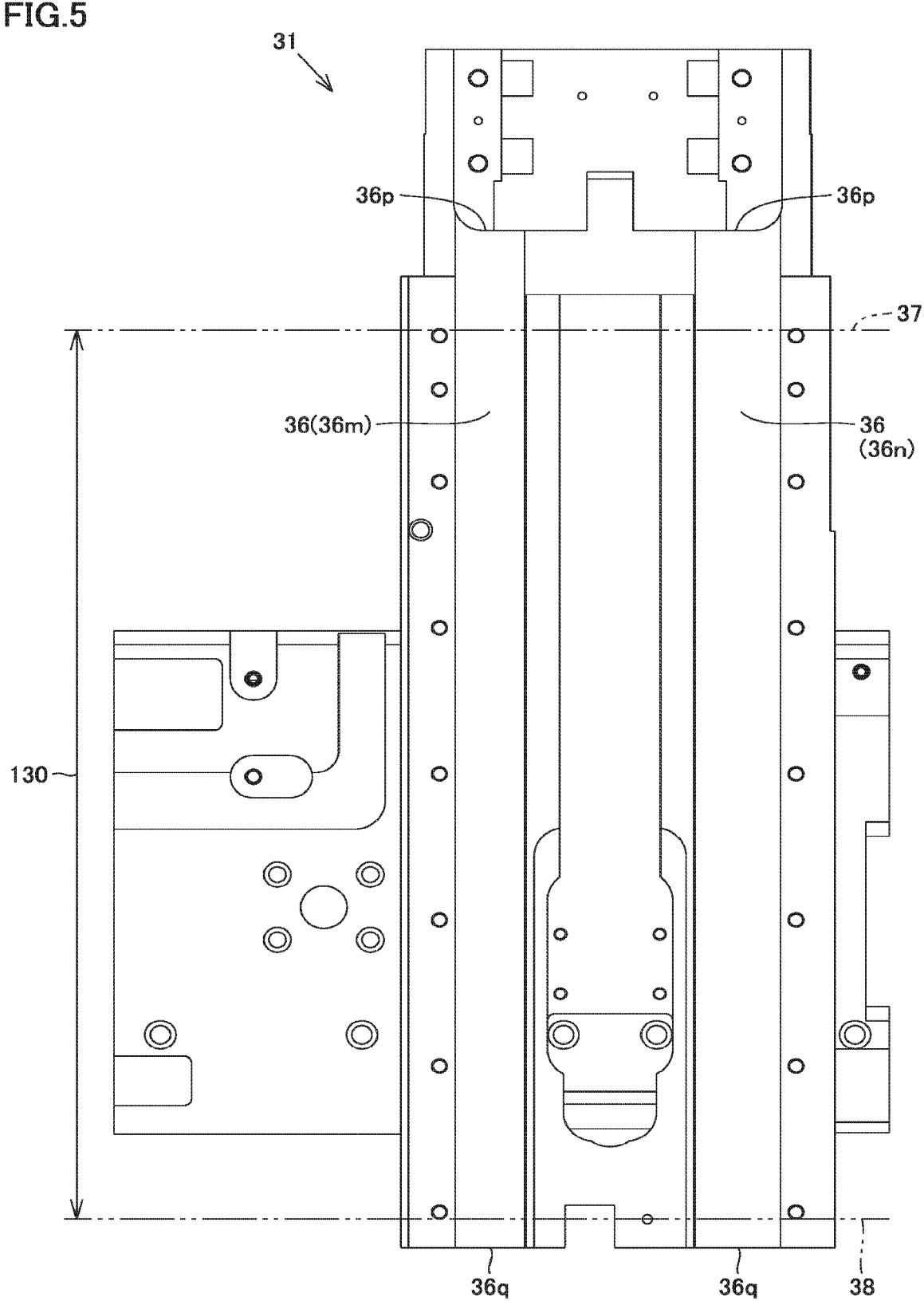
FIG. 5 shows a sliding surface (facing a cross slide) of the saddle included in the machine tool shown in FIG. 1.
Figure 6:
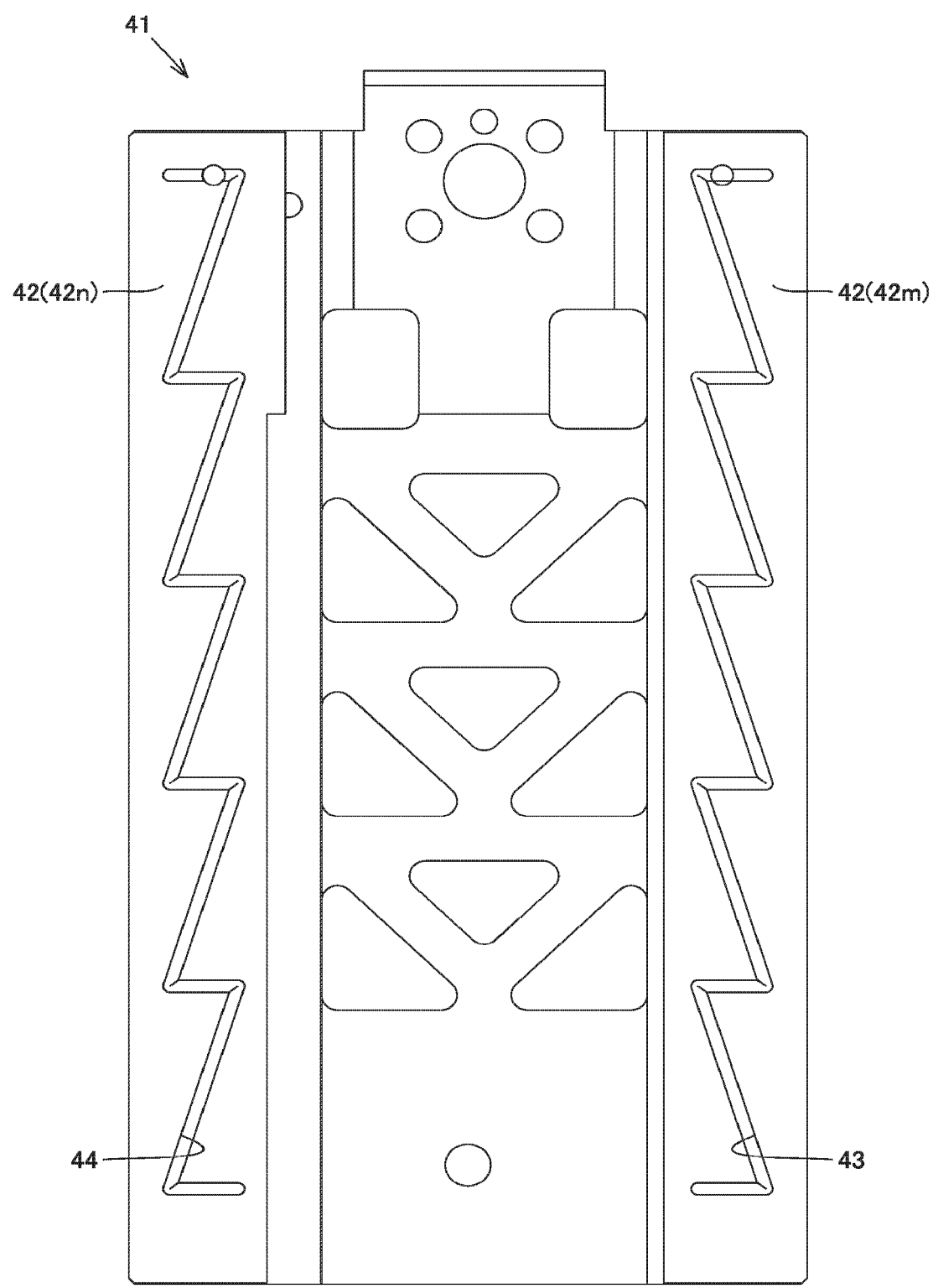
FIG. 6 shows a sliding surface of the cross slide included in the machine tool shown in FIG. 1.

FIG. 5 shows a sliding surface (facing the cross slide) of the saddle included in the machine tool shown in FIG. 1. FIG. 6 shows a sliding surface of the cross slide included in the machine tool shown in FIG. 1.

With reference to FIGS. 1-6, saddle 31 further has a sliding surface 36m and a sliding surface 36n (hereinafter, when sliding surface 36m and sliding surface 36n are not distinguished, they will collectively be referred to as a sliding surface 36). Sliding surface 36 extends in the direction along the x axis in an elongate form. Sliding surface 36m and sliding surface 36n extend in parallel in the direction along the x axis. Sliding surface 36m and sliding surface 36n are spaced in the direction along the z axis. Sliding surface 36 in a plan view is substantially a rectangle having a longer side in the direction along the x axis and a shorter side (i.e., a width) in the direction along the z axis.

Sliding surface 36 faces vertically upward (more specifically, obliquely upward). Sliding surface 36 extends on a back side of opposed surface 32 such that sliding surface 36 is orthogonal to opposed surface 32.

Cross slide 41 has opposed surfaces 42m and 42n (hereinafter, when opposed surfaces 42m and 42n are not distinguished, they will collectively be referred to as an opposed surface 42). Opposed surface 42 extends in the direction along the x axis in an elongate form. Opposed surface 42m and opposed surface 42n extend in parallel in the direction along the x axis. Opposed surface 42m and opposed surface 42n are spaced in the direction along the z axis. Opposed surface 42 in a plan view is substantially a rectangle having a longer side in the direction along the x axis and a shorter side in the direction along the z axis. A length of opposed surface 42 in the direction along the x axis is smaller than a length of sliding surface 36 in the direction along the x axis.

Cross slide 41 has a lubricant supply portion 43 and a lubricant supply portion 44 formed therein. Lubricant supply portion 43 and lubricant supply portion 44 are provided in opposed surface 42m and opposed surface 42n, respectively. Lubricant supply portions 43 and 44 extend in the form of grooves in surfaces of opposed surfaces 42m and 42n, respectively.

Cross slide 41 is placed on sliding surface 36 of saddle 31. Cross slide 41 is provided on saddle 31 such that opposed surface 42m and opposed surface 42n face sliding surface 36m and sliding surface 36n, respectively. Cross slide 41 is provided to straddle sliding surface 36m and sliding surface 36n.

As cross slide 41 moves in the direction along the x axis, cross slide 41 slides on sliding surface 36. At the time, a lubricant is supplied from cross slide 41 via lubricant supply portion 43 and lubricant supply portion 44 to sliding surface 36. Cross slide 41 moves in the direction along the x axis on sliding surface 36 between a first movement end 37 and a second movement end 38 (see FIG. 5). More specifically, cross slide 41 slides on sliding surface 36 in contact therewith in a stroke range 130 between first movement end 37 and second movement end 38.

Hereinafter, a shape of sliding surface 12 of bed 11 and opposed surface 32 of saddle 31 will be described.

Figure 7:
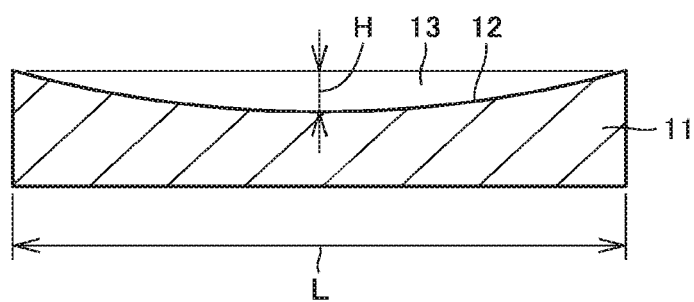
FIG. 7 is a cross section of the sliding surface of the bed taken along a line VII-VII shown in FIG. 3.

FIG. 7 is a cross section of the sliding surface of the bed taken along a line VII-VII shown in FIG. 3. With reference to FIG. 3 and FIG. 7, a recess 13 is formed in sliding surface 12 (12m, 12n) of bed 11. Recess 13 has a concave shape concaved in a direction farther away from saddle 31.

Recess 13 continuously extends in the direction in which saddle 31 moves (i.e., the direction along the z axis). Recess 13 continuously extends in the longer-side direction of sliding surface 12. Recess 13 is not provided in a form in which a plurality of recesses are aligned randomly in the direction in which saddle 31 moves; rather, it extends continuously in the direction in which saddle 31 moves.

A length of recess 13 in the longer-side direction of sliding surface 12 is larger than a length (a width) of recess 13 in the shorter-side direction of sliding surface 12. Recess 13 extends at least on sliding surface 12 between first movement end 14 and second movement end 16 (i.e., in stroke range 120). In the present embodiment, recess 13 extends between one end 12p and the other end 12q of sliding surface 12 in the direction in which saddle 31 moves (i.e., the direction along the z axis).

When bed 11 is cut along a plane orthogonal to the direction in which saddle 31 moves (i.e., the direction along the z axis) (i.e., in a cross section shown in FIG. 7), recess 13 has an arcuate cross section. Recess 13 has an arcuate cross section across the opposite ends of sliding surface 12 in the widthwise direction.

Recess 13 has the same cross sectional shape irrespective of the direction in which saddle 31 moves. In other words, irrespective of at which position in the direction along the z axis bed 11 is cut, recess 13 has the same cross sectional shape (an arcuate cross section having a fixed radius of curvature).

Figure 8:
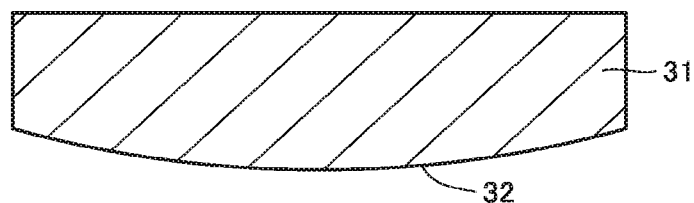
FIG. 8 is a cross section of an opposed surface of the saddle taken along a line VIII-VIII shown in FIG. 4.

FIG. 8 is a cross section of the opposed surface of the saddle taken along a line VIII-VIII shown in FIG. 4. With reference to FIG. 4 and FIG. 8, opposed surface 32 has a convex shape convexed toward bed 11. Opposed surface 32 is formed in a convex shape (an arcuate shape) corresponding to the concave shape of recess 13.

Note that FIG. 7 and FIG. 8 show the concave shape of sliding surface 12 and the convex shape of opposed surface 32, respectively, exaggerated.

According to this configuration, recess 13 formed in sliding surface 12 functions as a reservoir for a lubricant supplied to sliding surface 12, and the lubricant is easily held on sliding surface 12. Thus, saddle 31 can be smoothly slid on sliding surface 12. Furthermore, opposed surface 32 is formed in a convex shape corresponding to the concave shape of recess 13. This can increase a contact face between sliding surface 12 and opposed surface 32 to improve saddle 31's slidability, and attenuation against cutting vibration and the like.

When a structure of machine tool 10 in the first embodiment of the present invention described above is summarized, machine tool 10 in the present embodiment comprises: saddle 31 serving as a movably configured, first structure; and bed 11 serving as a second structure having sliding surface 12 supplied with a lubricant and allowing saddle 31 to slide thereon, and receiving the weight of saddle 31. Sliding surface 12 has recess 13 continuously extending in a direction in which saddle 31 moves.

According to machine tool 10 in the first embodiment of the present invention thus configured, by forming recess 13 in sliding surface 12 to function as a reservoir, a lubricant is held on sliding surface 12 for a longer period of time. Thus, machine tool 10 can be implemented which does not easily run short of a lubricant on sliding surface 12.

Although the above described effect is more remarkably presented for a slant bed type, the present invention is also applicable to a machine tool in which sliding surface 12 is provided as a horizontal surface.

Furthermore, while in the present embodiment a case has been described in which a first structure and a second structure in the present invention are saddle 31 and bed 11, respectively, the present invention is not limited to such a case.

For example, when the first and second structures in the present invention are cross slide 41 and saddle 31, respectively, a recess similar to recess 13 may be formed in sliding surface 36 (36m, 36n) of saddle 31. Furthermore, the present invention is applicable not only to a lathe but also for example to a sliding portion between a bed and a saddle of a machining center, a sliding portion between a saddle and a table thereof, and the like.

Figure 9:
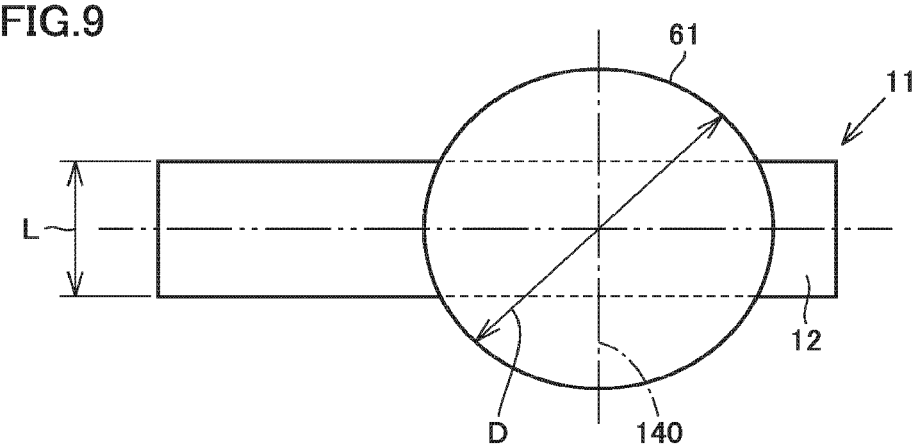
FIG. 9 is a plan view for illustrating a process for forming a recess in the sliding surface of the bed shown in FIG. 3 and FIG. 7.
Figure 10:
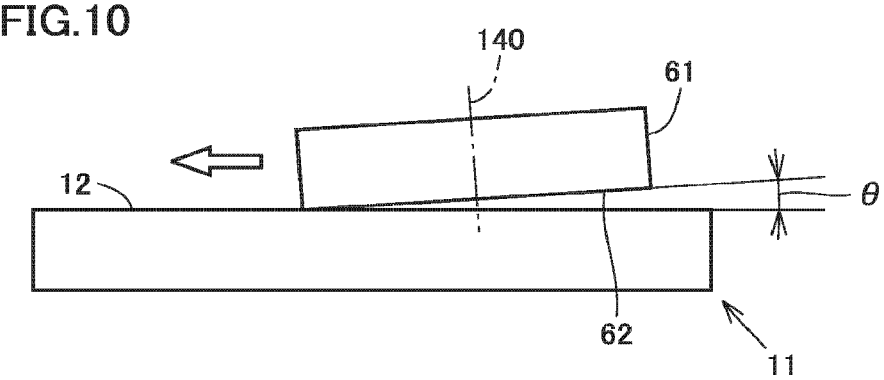
FIG. 10 is a side view for illustrating the process for forming the recess in the sliding surface of the bed shown in FIG. 3 and FIG. 7.

Hereinafter, a method for producing a structure for a machine tool in the first embodiment of the present invention will be described. FIG. 9 is a plan view for illustrating a process for forming a recess in the sliding surface of the bed shown in FIG. 3 and FIG. 7. FIG. 10 is a side view for illustrating the process for forming the recess in the sliding surface of the bed shown in FIG. 3 and FIG. 7.

With reference to FIG. 7, FIG. 9, and FIG. 10, a method for producing bed 11 as a structure for a machine tool comprises: preparing a rotary tool 61 for plane surface-machining; and forming recess 13 in sliding surface 12 of bed 11 by relatively moving rotary tool 61 and bed 11 such that sliding surface 12 of bed 11 and an axis of rotation 140 of rotary tool 61 intersect obliquely and a direction in which rotary tool 61 and bed 11 relatively move and axis of rotation 140 of rotary tool 61 intersect obliquely.

Although rotary tool 61 is not limited, in particular, as long as it is a tool capable of plane surface-machining, a representative example thereof is a milling tool. Furthermore, as rotary tool 61, a cutting tool such as an end mill, a grinding tool such as a grinding stone, or the like can also be used. Rotary tool 61 has a tool diameter D larger than a length L of sliding surface 12 in the widthwise direction.

In the process for forming recess 13 in sliding surface 12 of bed 11, rotary tool 61 and bed 11 are relatively moved. In the present embodiment, bed 11 is fixed, while rotary tool 61 is moved in the longer-side direction of sliding surface 12.

At the time, sliding surface 12 of bed 11 and axis of rotation 140 of rotary tool 61 intersect obliquely, and the direction in which rotary tool 61 moves and axis of rotation 140 of rotary tool 61 intersect obliquely.

In the present embodiment, rotary tool 61 is provided in a position leaning forward relative to the direction in which rotary tool 61 moves. An imaginary plane 62 where a locus of a tip of a chip of rotary tool 61 rotated and moved is provided and sliding surface 12 form an angle θ on a side rearward in the direction in which rotary tool 61 moves. Rotary tool 61 is provided such that rotary tool 61 contacts sliding surface 12 at a front end of rotary tool 61 in the direction in which rotary tool 61 moves and a distance between imaginary plane 62 and sliding surface 12 increases in a direction from the front end of rotary tool 61 in the direction in which rotary tool 61 moves toward a rear end of rotary tool 61 in the direction in which rotary tool 61 moves. Rotary tool 61 moves in the longer-side direction of sliding surface 12 with angle θ fixed.

Recess 13 formed through such a process has a depth H, which is calculated using tool diameter D of rotary tool 61, length L of sliding surface 12 in the widthwise direction, and angle θ formed by imaginary plane 62 of rotary tool 61 and sliding surface 12, as indicated in the following expression:

$$H=(D/2-(D/2 \times D/2 - L/2 \times L/2)^{1/2}) \times \sin\theta.$$

Preferably, recess 13 has depth H of 1 μm or more and 10 μm or less. Furthermore, when recess 13 has depth H of 3 μm or more and 5 μm or less, a significant effect is obtained.

According to this configuration, by using rotary tool 61 capable of plane surface-machining, recess 13 of an arcuate cross section which functions as a reservoir can be easily formed in sliding surface 12.

Second Embodiment

Figure 11:
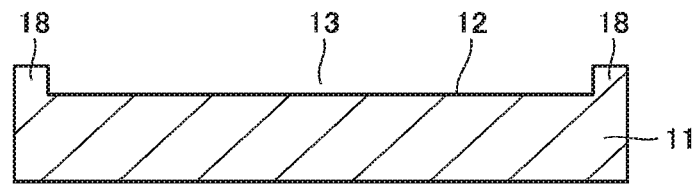
FIG. 11 is a cross section for illustrating a first exemplary variation of the recess in FIG. 7.
Figure 12:
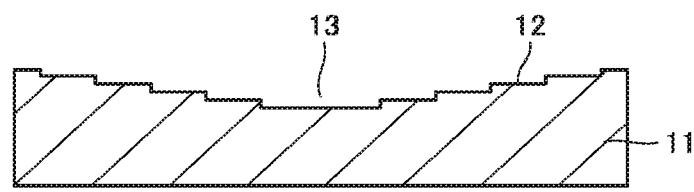
FIG. 12 is a cross section for illustrating a second exemplary variation of the recess in FIG. 7.
Figure 13:
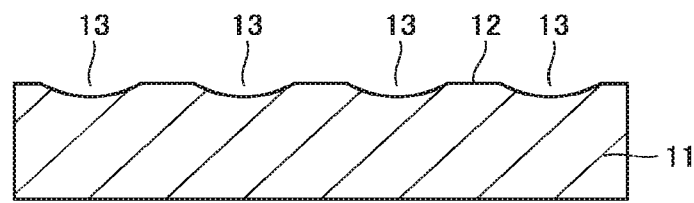
FIG. 13 is a cross section for illustrating a third exemplary variation of the recess in FIG. 7.

FIGS. 11-13 are cross sections for illustrating exemplary variations of the recess in FIG. 7 in cross section. In the present embodiment various exemplary variations in cross section of the recess shown in FIG. 7 will be described.

With reference to FIG. 11, in the present exemplary variation, when bed 11 is cut along a plane orthogonal to the direction in which saddle 31 moves, recess 13 has a rectangular cross section. Recess 13 is provided to form a wall portion 18 at the opposite ends of sliding surface 12 in the widthwise direction. The cross sectional shape of recess 13 is not limited to a rectangular shape, as indicated as one example in the present exemplary variation.

With reference to FIG. 12, in the present exemplary variation, when bed 11 is cut along a plane orthogonal to the direction in which saddle 31 moves, recess 13 has a stepped cross section allowing recess 13 to have a depth increased to be larger in a direction from the opposite ends of sliding surface 12 in the widthwise direction toward the center thereof in the same direction. According to this configuration, the arcuate cross section described in the first embodiment can be obtained in a pseudo manner.

With reference to FIG. 13, in the present exemplary variation, sliding surface 12 is provided with a plurality of recesses 13. The plurality of recesses 13 are mutually spaced in the widthwise direction of sliding surface 12. When bed 11 is cut along a plane orthogonal to the direction in which saddle 31 moves, the plurality of recesses 13 each have an arcuate cross section. In the present exemplary variation, the cross sectional shape of recess 13 is not limited to an arc.

According to the machine tool in the second embodiment of the present invention thus configured, a function and effect described in the first embodiment can be similarly achieved.

A machine tool according to the present invention comprises: a movably configured, first structure; and a second structure having a sliding surface supplied with a lubricant and allowing the first structure to slide thereon, and receiving a weight of the first structure. The sliding surface has a recess continuously extending in a direction in which the first structure moves.

Note that a plurality of recesses provided by scraping are provided discontinuously (or randomly) in the direction in which the first structure moves, and accordingly, they are not included in the recess according to the present invention.

According to the thus configured machine tool, the recess functions as a reservoir for a lubricant supplied to the sliding surface, and the lubricant is easily held on the sliding surface.

Still preferably, when the second structure is cut along a plane orthogonal to the direction in which the first structure moves, the recess has an arcuate cross section.

The machine tool thus configured can more reliably hold the lubricant on the sliding surface.

Still preferably, when the second structure is cut along a plane orthogonal to the direction in which the first structure moves, the recess has the same cross sectional shape irrespective of the direction in which the first structure moves.

According to the thus configured machine tool, an effect of easily holding the lubricant on the sliding surface can be constantly provided irrespective of the direction in which the first structure moves.

Still preferably, the first structure is configured to be movable on the sliding surface between a first movement end and a second movement end. The recess extends at least between the first movement end and the second movement end.

According to the machine tool thus configured, the lubricant is easily held on the sliding surface at least in a range in which the first structure moves.

Still preferably, the recess extends between one end and the other end of the sliding surface in the direction in which the first structure moves.

According to the machine tool thus configured, the lubricant is easily held on the sliding surface between one end and the other end of the sliding surface in the direction in which the first structure moves.

Still preferably, the first structure has an opposed surface facing the sliding surface. The opposed surface is formed in a convex shape corresponding to the concave shape of the recess.

The machine tool thus configured can render satisfactory the first structure's slidability on the sliding surface.

Still preferably, the sliding surface, in a widthwise direction orthogonal to the direction in which the first structure moves, is slanted relative to the horizontal direction.

The machine tool thus configured can suppress flowing of the lubricant from the sliding surface to fall in the widthwise direction of the sliding surface.

A method for producing a structure for a machine tool according to the present invention is a method for producing a structure for a machine tool having a sliding surface. The method for producing a structure for a machine tool comprises: preparing a rotary tool for plane surface-machining; and forming a recess in a sliding surface by relatively moving the rotary tool and the structure with the rotary tool and the structure having their postures fixed such that the sliding surface and an axis of rotation of the rotary tool intersect obliquely and a direction in which the rotary tool and the structure relatively move and the axis of rotation of the rotary tool intersect obliquely.

According the method for producing a structure for a machine tool, as configured above, a recess which functions as a reservoir for a lubricant supplied to the sliding surface can be easily formed in the sliding surface.

The present invention is applied to machine tools such as a lathe, a machining center and the like, a composite processing machine including a turning function and a milling function, a grinding machine, and the like.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. A machine tool comprising:
   a movably configured, first structure; and
   a second structure having a recess comprising a sliding surface, the recess being supplied with a lubricant and allowing the first structure to slide thereon, and receiving a weight of the first structure,
   the recess continuously extending in a direction in which the first structure moves, wherein the recess has a depth of 1 μm or more and 10 μm or less, and
   when the second structure is viewed in cross section along a plane orthogonal to a direction in which the first structure moves, the recess has a single arcuate cross section extending continuously between opposite ends of the sliding surface in a widthwise direction orthogonal to the direction in which the first structure moves.

2. The machine tool according to claim 1, wherein when the second structure is viewed in cross-section along a plane orthogonal to the direction in which the first structure moves, the recess has a same cross sectional shape at all points along the direction in which the first structure moves.

3. The machine tool according to claim 1, wherein:
   the first structure is configured to be movable on the sliding surface between a first movement end and a second movement end; and
   the recess extends at least between the first movement end and the second movement end.

4. The machine tool according to claim 2, wherein:
   the first structure is configured to be movable on the sliding surface between a first movement end and a second movement end; and
   the recess extends at least between the first movement end and the second movement end.

5. The machine tool according to claim 3, wherein the recess extends between one end and the other end of the sliding surface in the direction in which the first structure moves.

6. The machine tool according to claim 4, wherein the recess extends between one end and the other end of the sliding surface in the direction in which the first structure moves.

7. The machine tool according to claim 1, wherein:
   the first structure has an opposed surface facing the sliding surface; and
   the opposed surface is formed in a convex shape corresponding to a concave shape of the recess.

8. The machine tool according to claim 1, wherein the sliding surface, in a widthwise direction orthogonal to the direction in which the first structure moves, is slanted relative to a horizontal direction.

9. A method for producing a structure having a sliding surface for a machine tool comprising a movably configured, first structure; and a second structure having a recess comprising a sliding surface, the recess being supplied with a lubricant and allowing the first structure to slide thereon, and receiving a weight of the first structure, the recess continuously extending in a direction in which the first structure moves, wherein the recess has a depth of 1 μm or more and 10 μm or less, and when the second structure is viewed in cross section along a plane orthogonal to a direction in which the first structure moves, the recess has a single arcuate cross section extending continuously between opposite ends of the sliding surface in a widthwise direction orthogonal to the direction in which the first structure moves, the method comprising:
   preparing a cutting tool for plane surface-machining; and
   forming a recess in the second structure surface by moving the cutting tool relative to the second structure surface, the cutting tool and the second structure surface having their postures fixed such that the second structure surface and an axis of rotation of the cutting tool intersect obliquely, and a direction in which the cutting tool moves relative to the second structure surface and the axis of rotation of the cutting tool intersect obliquely,
   wherein the recess has a maximum depth of 1 μm or more and 10 μm or less, and the cutting tool is a milling tool or an end mill.

10. The method for producing the structure for the machine tool according to claim 9, wherein:
   when the structure is viewed in cross-section along a plane orthogonal to the direction in which the cutting tool moves relative to the second structure surface, the recess has a single arcuate cross section across opposite ends of the second structure surface in a widthwise direction orthogonal to the direction in which the cutting tool moves relative to the second structure surface; and
   the cutting tool has a tool diameter larger than a length of the second structure surface in the widthwise direction.

* * * * *